UNITED STATES PATENT OFFICE.

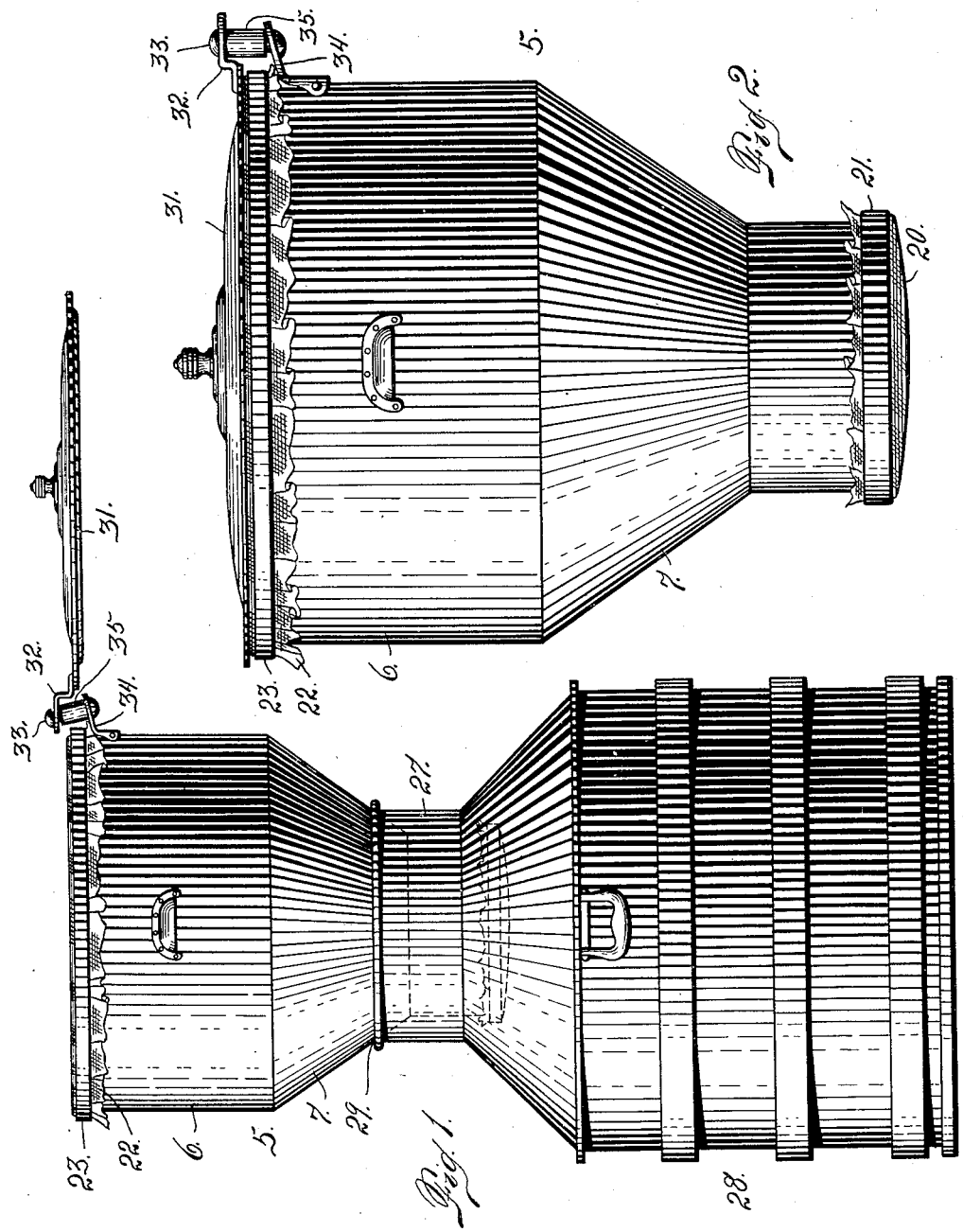

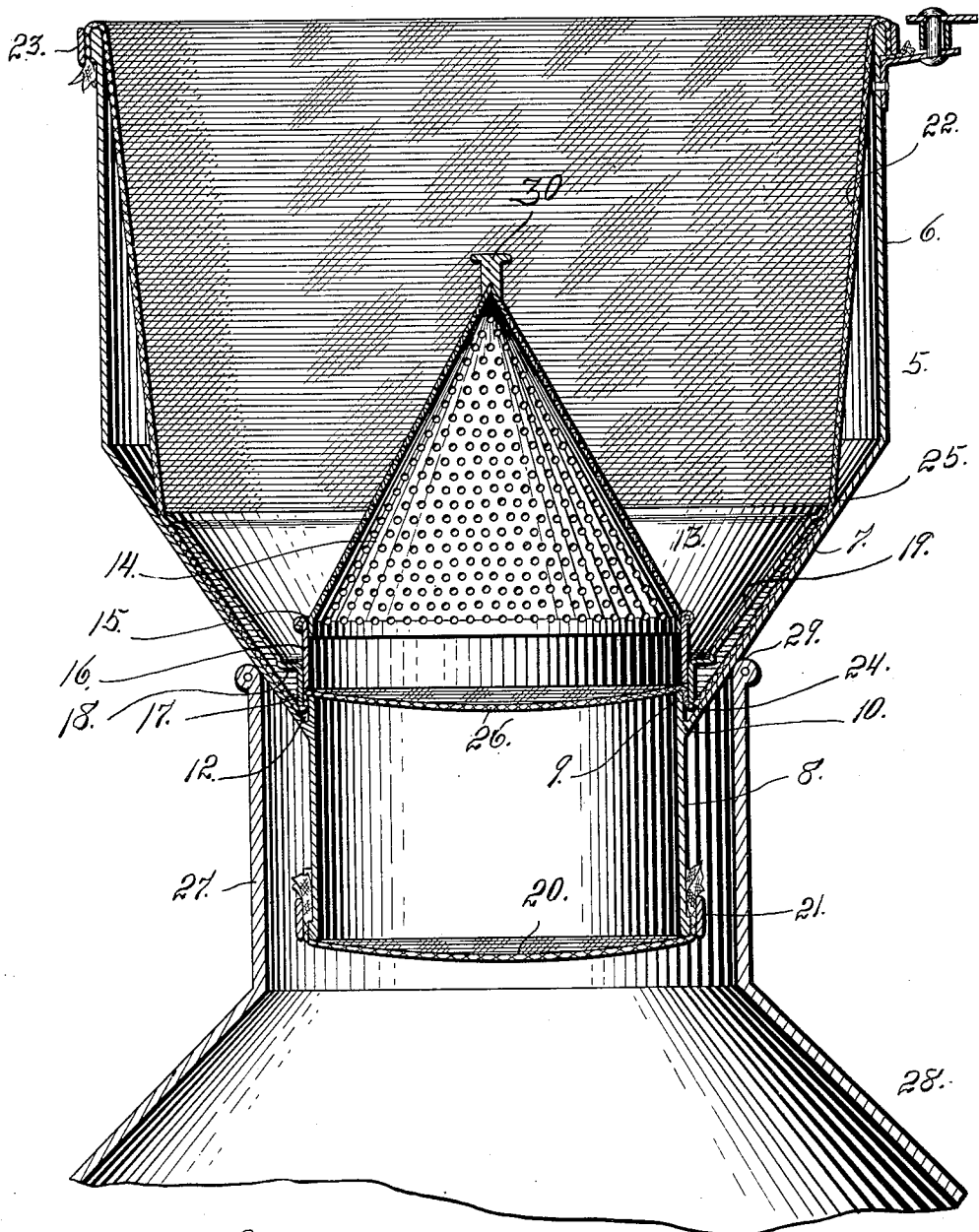

JOHN W. FREDRUM, OF DENVER, COLORADO.

MILK-STRAINER.

969,357. Specification of Letters Patent. Patented Sept. 6, 1910.

Application filed July 30, 1909. Serial No. 510,400.

*To all whom it may concern:*

Be it known that I, JOHN W. FREDRUM, a citizen of the United States, residing in the city and county of Denver and State of Colorado, have invented certain new and useful Improvements in Milk-Strainers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in milk strainers my object being to provide a construction of this class which shall effectually perform the strainer function, provision being made for the lodgment of any solid foreign matter that may be contained in the milk, whereby said foreign matter is entirely removed from the strainer medium. Provision is also made to prevent the clogging of the strainer cloth by causing any solid matter contained in the milk to pass to the aforesaid lodgment without coming in direct contact at any time with the strainer cloth or other medium.

Having briefly outlined my improved construction, I will proceed to describe the same in detail, reference being made to the accompanying drawing in which is illustrated an embodiment thereof.

In this drawing: Figure 1 is a side elevation of a milk bucket with my improved construction in place, the cover of the strainer being open. Fig. 2 is a detail elevation of the strainer shown on a larger scale. Fig. 3 is a vertical section taken through the strainer, cutting the upper portion of the milk bucket, the strainer being shown in place and the parts being illustrated on a still larger scale.

The same reference characters indicate the same parts in all the views.

Let the numeral 5 designate my improved strainer, considered in its entirety and whose body portion is composed of an upper cylindrical portion 6, a frusto-conical portion 7, extending downwardly from the lower edge of the portion 6; and a cylindrical part 8, extending downwardly from the lower extremity of the part 7. The part 8 is open at the bottom and provided with an upwardly projecting flange 9, extending above the union 10 between the lower extremity of the part 7 and the upper extremity of the part 8, thus forming a circumferential recess 12 between the flange 9 and the lower extremity of the part 7. Detachably connected with the body of the strainer and located within the same, when the parts are assembled, is a member 13 composed of a centrally located cone-shaped part 14, whose base is connected as shown at 15, with a depending cylindrical part 16, secured at its lower extremity to a relatively short, vertically disposed cylindrical part or ring 17, which is bent outwardly as shown at 18, to form an offset, from which an outwardly flared part 19 extends upwardly, approximately parallel with the part 7 of the body member.

The lower open extremity of the part 8 of the body member is covered by a milk straining medium 20, composed of cloth or other suitable mesh material. The outer edge of this strainer cloth is carried upwardly around the lower edge of the part 8 and secured in place by a ring or band 21.

Before placing the strainer member 13 in position, a relatively large milk straining medium 22, composed of cloth or other suitable mesh material is placed within the body of the strainer, whereby it is caused to cover the upper extremity of the part 8 resting upon the upper edge of the upwardly projecting flange 9. This strainer cloth has its upper edge bent over the upper edge of the part 6 and secured in place by a top ring 23. The central member 13 is then placed in position and its ring 17, whose lower edge projects downwardly below the cylindrical part 16, engages the strainer cloth and forces it downwardly into the circumferential recess 12, as shown at 24. The upper edge of the outwardly flared part 19 also engages the strainer cloth at 25, and presses it tightly against the inner surface of the part 7. The size of the cloth is such that when the central member 13 is placed in position, as just explained, the cloth will be held sufficiently taut for the purpose. In fact the securing of the cloth at the upper edge of the part 6 may be done last, thus giving the user an opportunity to stretch the cloth taut or give it the desired tension, as the securing ring is applied. The part of the strainer cloth covering the upper extremity of the member 8 is designated 26 (see Fig. 3). When the strainer is in use, this lower part is set within the upper reduced part 27 of the milk bucket 28, the lower part of the body member 7 engaging the upper edge of the milk bucket top, as shown at 29.

To the apex of the cone-shaped perforated member 14 is attached a protecting button 30, which prevents injury to the top of the cone and also secures the fabric of the cone at this point.

Assuming that the parts of the strainer are assembled in the relation illustrated in Fig. 3, the milk to be strained is poured into the structure, coming in contact with the upper part of the strainer cloth, above the outwardly flared part 19 of the centrally located member. The milk also comes in contact with the perforated, cone-shaped part 14, whose mesh, while not sufficiently fine, for perfectly straining the milk, is nevertheless so fine as to reject any relatively large solid particles of foreign matter or substance, which are caused to roll down the outer surface of the cone and find lodgment upon the offset 18, surrounding the cylindrical part 16 at the base of the cone, the offset being far enough below the upper edge of the part 16 to form a chamber of sufficient size for the purpose. Practically all of the milk must pass through the perforated cone 14, since any milk which passes through the upper part of the strainer cloth 22 above the upper edge of the outwardly flared part 19, finds no escape and must therefore return through the strainer cloth, passing through the cone 14 and thence through the strainer cloth parts 26 and 20 in succession, before entering the milk bucket. It will thus be observed that all of the milk is first caused to pass through the relatively coarse strainer part 14, whereby the foreign particles of relatively large size are removed, after which it is caused to pass in succession through the strainer cloth parts 26 and 20 whereby it is thoroughly strained.

The upper part of the strainer body is equipped with a cover 31, having an ear 32, connected with a pivot pin 33, the latter being mounted upon an ear 34, secured to the upper part of the strainer body. Interposed between the ears 33 and 34, is a spacing sleeve 35. By virtue of this connection, the cover may be quickly thrown to the closed or open position. Of course when the strainer is in use, the cover must be open but it is desirable to have the strainer closed at all times when not in use, hence the necessity for a cover.

Having thus described my invention, what I claim is:

1. A milk strainer, composed of a body member, having a reduced part extending downwardly from the upper part of the body member, and adapted to enter the milk bucket, the said reduced part having a flange projecting upwardly from its connection with the upper part of the body member, forming a circumferential recess, a strainer cloth adapted to rest upon the top of the upwardly projecting flange and a centrally located member having a perforated upwardly projecting part, a depending cylindrical part, adapted to enter the said circumferential recess, and an outwardly flared part, forming a circumferential lodgment for foreign matter, between the outwardly flared part and the said cylindrical part of the central member, substantially as described.

2. A strainer composed of a body member, having its lower portion reduced in size and adapted to enter the body of the milk bucket or other receptacle, the said lower part having a flange projecting upwardly above the connection between the lower and upper parts of the body member, and a centrally located member having a perforated, cone-shaped upwardly projecting part, provided with a depending cylindrical portion, adapted to enter the said circumferential recess, a strainer cloth passing over the top of the said flange and adapted to be pressed into the said recess by the cylindrical depending part of the central member, substantially as described.

3. A strainer composed of a body member, having a reduced cylindrical part, extending downwardly from the lower edge of the upper portion of the body member, the latter being outwardly flared from the said connection, the lower cylindrical part projecting upwardly above the said connection to form a circumferential recess, a strainer cloth adapted to engage the upper edge of the said flange and also to overlap the upper edge of the body member, and a centrally located member having a perforated, cone-shaped, upwardly projecting central part, a depending, cylindrical part, adapted to press the strainer cloth into the said circumferential recess, and an outwardly flared part, connected with the cylindrical part below its upper edge to form a lodgment for foreign matter, the upper edge of the outwardly flared part being adapted to press the strainer cloth tightly against the adjacent wall of the body member, substantially as described.

4. A strainer comprising a body member, composed of an upper cylindrical part, a lower frusto-conical part, and a bottom cylindrical part, extending downwardly from its connection with the lower edge of the frusto-conical part and having a flange projecting upwardly from said connection, a strainer cloth adapted to engage the upper edge of the said flange and also the upper edge of the cylindrical part of the body member, and a centrally located member having a perforated cone-shaped central part, to which is made fast a depending cylindrical part, and an outwardly flared frusto-conical part connected with the cylindrical part, below its upper edge, the upper edge of the frusto-conical part being arranged to press the strainer cloth tightly against the adjacent wall of the frusto-conical part of the body member, substantially as described.

5. A strainer, composed of a body part, whose lower portion is adapted to enter the top of a milk bucket or other receptacle, a centrally located member having an integrally formed perforated cone-shaped upwardly projecting part, the lower part of the body member below the cone-shaped part of the central member having a circumferential flange or shoulder on its inner periphery, a strainer supported by the said flange or shoulder within the circular member, and a second strainer carried by the lower part of the said circular member, through which strainers the milk must pass after passing through the perforated cone-shaped member.

6. A milk strainer, comprising a body member, having an upper frusto-conical part, a cylindrical part, extending downwardly from its connection with the frusto-conical part, and having a flange projecting upwardly from said connection, a strainer cloth attached to the lower extremity of the depending cylindrical part, a second strainer cloth engaging the upper edge of the said upwardly projecting flange and adapted to overlap into the recess between said flange and the adjacent frusto-conical body part, and a centrally located, perforated, cone-shaped part, having a depending cylindrical portion adapted to engage the strainer cloth outside of the said upwardly projecting flange, substantially as described.

In testimony whereof I affix my signature in presence of two witnesses.

JOHN W. FREDRUM.

Witnesses:
A. J. O'Brien,
A. Ebert O'Brien.